Patented July 8, 1947

2,423,542

UNITED STATES PATENT OFFICE 2,423,542

MONOAZO DYES

John Wright, Spondon, near Derby, England, assignor to British Celanese Limited, London, England, a company of Great Britain No Drawing. Application July 8, 1942, Serial No. 450,189. In Great Britain August 13, 1941

10 Claims. (Cl. 260—206)

This invention relates to the manufacture of new azo dyes and to their application for the colouring of cellulose acetate and other cellulose ester or ether materials.

It has been found that azo benzenes free from nitro groups, having a primary amino group in para position to the azo group, and having three or four substituents each in an ortho position to the azo group are products of great value for use in the colouring of fibers, foils, films and the like of cellulose acetate or other cellulose esters or ethers. With the aid of compounds of this type it is possible to dye such cellulose ester or ether materials by direct dyeing methods in golden yellow shades which are of very good fastness, particularly to light, and are not phototropic. The compound 4-amino-2:6-dichloro-4' methoxy-2':6'-dimethyl-azo-benzene is a compound of this type. The amino-azo compounds are preferably free from nuclear nitro-, hydroxyl, and sulphonic groups.

Various atoms and groups can be present as the three or four substituents in ortho positions to the azo group. Examples are chlorine, bromine, alkyl groups for example methyl, alkoxy groups for example, methoxy, ethoxy and beta-hydroxy-ethoxy, and acidylamino groups, for example the acetylamino group.

Examples of the new amino azo compounds of the invention are the following:

1. 4-amino-2-chlor-2':6'- dimethyl-4'-methoxy-azo-benzene
2. 4-amino-2:6-dichlor-2':6'-dimethyl-4'-methoxy-azo-benzene
3. 4-amino-2-chlor-6-brom - 2':6' - dimethyl-4-methoxy-azo-benzene
4. 4-amino-2:6:2':6'-tetramethyl-azo-benzene
5. 4-amino-2-acetylamino - 6 - methoxy-2':4':6' trichlor-azo-benzene
6. 4-amino-2:6-dichlor-2'-methoxy - 4 methyl-azo-benzene
7. 4-amino-2:6-dichlor - 2'-methyl-4'-methoxy-azo-benzene One method of producing the new amino azo compounds is to reduce to an amino group the nitro group of a corresponding nitro azo compound. Such reduction can be effected, for example, by means of sodium sulphide or sodium hydrosulphide solution. In this way the nitro group can be reduced to an amino group without scission of the azo group.

The compounds numbered 1, 2 and 6 above can conveniently be produced by this method. The nitro compounds can be obtained by coupling an appropriately substituted 4-nitro-diazo benzene with the appropriately substituted ortho- or para-coupling phenol and methylating the hydroxyl group of the nitro hydroxy azo compounds thus obtained. Analogous, nitro-alkoxy-azobenzenes suitable for use according to the invention can be obtained by using other alkylating agents capable of introducing other alkyl groups, e. g. ethyl.

A second method of obtaining the new amino-azo compounds is to remove the acidyl group from the corresponding acidyl-amino-azo compounds by hydrolysis. Compound No. 2 above can be produced by saponifying the acetyl group of 4-acetyl-amino-2:6-dichlor - 2':6'- dimethyl-4'-methoxy-azo-benzene.

Still a further method of obtaining the new amino-azo compounds is to couple an ortho substituted diazo benzene with a meta substituted para coupling aniline, the diazo compound and the meta substituted aniline being selected so that the two positions ortho to the diazo group and the two positions meta to the amino group of the aniline carry between them at least three substituents. Suitable diazo components of which the diazo compounds can be used are 2:6-dimethyl-aniline, 2:4:6-trichlor-aniline and 3-methoxy-4-amino toluene. Suitable meta substituted anilines for use as coupling components are 3:5-dimethyl-aniline, 3:5-dichlor-aniline, 3-chlor-5-methyl-aniline; 3-chlor-aniline, and 3-acetyl-amino-5-methoxy-1-amino-benzene. For example, compound No. 4 above can be obtained by coupling diazotised-2:6-dimethyl-aniline with 3:5-dimethyl-aniline. Again, compound No. 5 can be made by coupling diazotised 2:4:6-trichlor-aniline with 3-acetyl-amino-5-methoxy-1-amino-benzene.

If desired, the new amino azo compounds can be obtained by coupling a diazo compound of the kind referred to above with an N-alpha-sulpho-alkyl or other N-substituted derivative of a meta substituted aniline also of the kind referred to above, for example, the sulphuric or nitramino acid of the same amine, the said derivative being one which is capable of coupling in para position to the amino group and from which the N-substituent is readily removable, and thereafter removing the said N-substituent. For this method of preparation the N-alpha-sulpho-alkyl compounds such as can be obtained by acting on the primary meta substituted aniline with an aldehyde and a bisulphite or with an aldehyde bisulphite compound are particularly suitable. For instance, there can be used the N-sulpho-methyl compounds obtainable by the action of formaldehyde bisulphite upon the meta substituted anilines. The N-alpha-sulpho-alkyl group can readily be split off, for example by heating with aqueous alkali. This method of working can be employed in the case of any of the meta substituted anilines specified above as coupling components.

The new amino azo compounds are conveniently applied to cellulose acetate or other cellulose ester or ether materials in the form of aqueous dispersions. These can be made, for example, by treating the amino-azo compounds with water and dispersing agents with or without protective colloids, or by dissolving the aminoazo compounds in water miscible organic liquids and pouring the solution so obtained into water, preferably in the presence of a protective colloid, or by milling or grinding the amino-azo compounds with water with or without the addition of dispersing agents and/or protective colloids.

The invention includes liquid, paste, powder or other preparations comprising the new aminoazo compounds together with dispersing agents and/or protective colloids. Such preparations preferably contain at least 5% of the aminoazo compounds and dye baths containing the amino-azo compounds are very conveniently prepared with the aid of such preparations.

The amino-azo compounds can be applied to cellulose acetate or other cellulose ester or ether textile materials either by dyeing methods or by printing, padding, or other mechanical impregnating methods. In the case of printing or other mechanical impregnating method a subsequent steaming of the material is in general desirable to fix the dye on the material.

Textile and other materials can also be coloured with the aid of the new amino-azo compounds by coupling the diazo compounds of the latter on the material with various coupling components which can be either enolic compounds or aromatic amines. Enolic coupling components which can be employed include the following:

(a) Hydroxy benzenes, for example phenol, ortho-meta-, or para-cresol, meta-hydroxy-diphenyl-amine, and aryl amides of ortho-hydroxy-benzene-carboxylic acids.
(b) Hydroxy-naphthalenes, for example beta-naphthol, 2:3 - hydroxy-naphthoic acid, and the aryl amides of the latter.
(c) Pyrazolones, e. g. 1-phenyl-3-methyl-5-pyrazolone.
(d) Aryl amides of beta keto carboxylic acids, e. g. aryl amides of aceto-acetic acid, or of benzoyl acetic acid and including the di-acyl-acetyl derivatives of aromatic diamines such as diaceto-acetyl-ortho-tolidine.

Very good results can be obtained with the aid of para coupling amino coupling components, of which the following may be mentioned:

(a) N-substituted amino-benzenes, for example N-alkyl amino-benzenes, e. g. N-diethylaniline N-diethyl-meta-toluidine; the hydroxy-alkyl-anilines referred to in British Patent No. 506,740; the N-substituted meta-aminophenol ethers mentioned in British Patent No. 533,439; and the meta-acidylamino substituted anilines mentioned in British Patent No. 523,287.
(b) N-substituted alpha-amino-naphthalenes, for example N-ethyl-alpha-naphthylamine or N-benzyl alpha-naphthylamine.

The amine coupling components are particularly useful. With their aid it is possible to produce on, for instance, cellulose acetate artificial silk, a range of red and brownish red shades of very good fastness properties.

When using the new amino-azo compounds for diazotisation on cellulose acetate and coupling with coupling components, the procedure most desirable depends upon the nature of the coupling components employed. For example, when employing aryl amides of 2:3-hydroxy-naphthoic acid very good results can be obtained by applying both the amino-azo compound and the aryl amide to the material and thereafter treating the material so as to diazotise the amino-azo compound and cause its diazo compound to couple with the aryl amide. In the case of phenol or cresol or the above-mentioned para-coupling amine coupling components, it is preferred to incorporate the amino-azo compound in the material and then to effect diazotisation and coupling with the coupling component in separate baths.

The amino-azo compounds of the present invention have substantive affinity for cellulose esters or ethers but, in general, substantially no affinity for cellulose. If, therefore, such amino-azo compound is applied to mixed materials containing both cellulose, e. g. cotton or regenerated cellulose, and a cellulose ester or ether, the latter alone takes up the amino-azo compound, so that on diazotising and coupling with the coupling component the cellulose component of the material remains uncoloured. By suitably colouring the cellulose component of such mixed material with dyestuffs resisting the cellulose ester or ether component of the materials solid shades or two colour effects can readily be obtained according to the components and dyes selected. The dyestuff for the cellulose portion can be applied before or after the development of the azo dye on the cellulose ester or ether portion. If applied before development of the azo dye it may be applied either together with or separately from the amino-azo compound applied to the cellulose ester or ether portion. If the dyestuff for the cellulose component is diazotisable it can be diazotised and developed with a suitable coupling component at any convenient stage of the operation. Further, if desired, the coupling component employed in accordance with the present inventon for the formation of an azo dye on the cellulose ester or ether component of the material may simultaneously be used to develop the diazotised dyestuff on the cellulose component of the mixed material.

Dyes can also be produced in substance from the new amino-azo compounds by diazotising and coupling with coupling components, for example, those mentioned above for coupling with the diazotised amino-azo compounds on cellulose ester or ether materials. The disazo and other polyazo dyes thus obtained can be employed for colouring cellulose ester or ether materials by direct dyeing methods, though, in general, this method of colouring such materials is less advantageous than the method of forming the dyes on the fibres as described above. When formed in substance the dyes are of particular value for colouring cellulose ester or ether solutions, especially lacquers and spinnng solutions. By shaping and setting such solutions in the form of fibres, foils, films and the like valuable coloured products can be produced. For example, coloured cellulose acetate fibres can be produced by dry spinning such coloured solutions. Particularly useful dyes for the purpose can be obtained by coupling the diazotised amino azo compounds with an N-substituted aniline capable of coupling in para position to the substituted amino group and having as a substituent in meta position to the substituted amino group, an amino group acidylated with an aliphatic acid containing at least 9 carbon atoms. Such N-substituted anilines are disclosed in U. S. application S. No. 448,834, filed June 27, 1942. The polyazo dyes so obtained are of the general formula

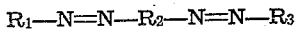

wherein $R_1$ and $R_2$ are benzene nuclei and have between them at least three substituents each in ortho-position to the azo group uniting them, wherein the azo groups are in para positions of the nucleus $R_2$, and wherein $R_3$ is the residue of an azo coupling component. Again they may be used for colouring fibres, foils, films and the like of synthetic linear polymers, for example superpolyamide fibres, e. g. fibres of superpolyamides obtained from hexamethylene diamine and adipic acid.

EXAMPLE I

*Preparation of 4-amino-2:6-dichlor-2':6'-dimethyl-4'-methoxy-azobenzene*

207 parts of 2:6-dichlor-4-nitraniline are slowly added to a stirred solution of nitrosyl sulphuric acid prepared by dissolving 70 parts of dry sodium nitrite in 1300 parts of sulphuric acid, raising the temperature to 70° C., and allowing to cool. During the addition of the 2:6-dichloro-4-nitraniline the temperature is kept at 30–35° C. When the addition is completed the mixture is stirred for two hours and poured into a mixture of 4000 parts of ice and 1000 parts of water, and the aqueous diazo solution is slowly added to a solution of 122 parts of 1:3:5-xylenol in 2000 parts of water and 40 parts caustic soda at the same time adding sufficient sodium carbonate to maintain the liquid alkaline to brilliant yellow paper. After acidifying, the dyestuff so formed is filtered off, dissolved in 2000 parts of water and 100 parts of caustic soda, and warmed to 70° C. 150 parts of dimethyl sulphate are then added gradually and finally the temperature is raised to 100° C. After stirring 1 hour at 100° C. the 4-nitro- 2:6 -dichlor-2':6'-dimethyl-4'-methoxyazobenzene is filtered off and added to a solution of 300 parts of sodium sulphide in 2000 parts of water. The temperature is raised to 80–90° C. till reduction is complete, and after cooling the 4-amino-2:6-dichlor-2':6'-dimethyl-4'-methoxyazobenzene is filtered off. When dyed on to cellulose acetate it gives bright golden yellow shades.

EXAMPLE II

*Preparation of 4-amino-2:6-dichlor-2'-methyl-4'-methoxy-azobenzene*

207 parts of 2:6-dichlor-4-nitraniline are diazotised as in Example I and the diazo solution added to a solution of 108 parts of m-cresol in 40 parts of caustic soda and 1000 parts of water, at the same time adding sufficient sodium carbonate to maintain the coupling alkaline to brilliant yellow paper. After acidifying the dye so formed is filtered off and dissolved in 2000 parts of water and 100 parts of caustic soda. The whole is then warmed to 70° C. and 150 parts of dimethyl sulphate added with good stirring, and finally the temperature is raised to 100° C. for two hours. After cooling, the dye is filtered off and added to a solution of 300 parts of sodium sulphide in 2000 parts of water. The temperature is then raised to 80–90° C. till reduction is complete, and after cooling the 4-amino-2:6-dichlor-2'-methyl-4'-methoxyazobenzene is filtered off. When dyed on to cellulose acetate fibres it gives bright golden yellow shades.

EXAMPLE III

*Preparation of 4-amino-2:6:2':6'-tetramethylazobenzene*

117 parts of 2:6-dimethylaniline are dissolved hot in 300 parts hydrochloric acid (32° Tw.) and 1000 parts of water, cooled by the addition of ice, and diazotised by the addition of 69 parts of sodium nitrite dissolved in 500 parts of water. The resultant diazo solution is added with good stirring to a solution of 121 parts of 1:3:5-xylidine in 4000 parts of water and 120 parts of hydrochloric acid (32° Tw.). After stirring for one hour the liquid is rendered neutral to Congo red paper by the addition of sodium acetate and the dye filtered off and either milled as a 10% aqueous paste or mixed with a dispersing agent and dried. When dyed on cellulose acetate it gives bright golden yellow shades.

EXAMPLE IV

*Application of 4-amino-2:6-dichlor-2':6'-dimethyl-4'-methoxy azobenzene to cellulose acetate and diazotisation and development on the fibre*

10 parts of a 10% aqueous paste of 4-amino-2:6-dichlor-2':6'-dimethyl -4'- methoxy-azobenzene is dispersed in the normal manner and the dispersion added to 4000 parts of soft water containing 0.25 g. p. l. soap. 100 parts of a cellulose acetate fabric are now worked in the dye liquor while the temperature is raised to 70–80° C. and worked at this temperature for 1 hour 30 minutes. The fabric is now removed and washed in water. The fabric, which is now dyed a bright golden yellow, is immersed in a diazotising bath prepared with 3000 parts of water, 20 parts of commercial concentrated hydrochloric acid, and 5 parts of sodium nitrite. It is worked in this bath for 30–45 minutes, taken out, washed, and then immersed in a developing bath containing 1.2 parts of m-acetylamino-diethylaniline dispersed with 6–8 parts of Turkey red oil in 3000 parts of water at 40° C. After immersion the temperature is raised to 60° C. and maintained at this temperature for a further 30–45 minutes while the fabric is worked in the bath. At the end of this time the fabric is removed, soaped for 30 minutes at 60° C. in a bath of 3000 parts of water containing 0.25 g. p. l. of soap. The fabric is then washed and dried. The shade so obtained is a full crimson. The dye so formed on the material can be described as 4-(p-diethylamino-o-acetylamino-benzene-azo-) - 2:6 - dichlor -2':6'- dimethyl -4'-methoxy-azobenzene.

EXAMPLE V

*Preparation of azo dye from 4-amino-2:6-dichlor-2':6' dimethyl 4' methoxy azo-benzene and m-stearoylamino-diethylaniline*

32.4 parts of 4 amino-2:6-dichlor-2':6'-dimethyl-4'-methoxy-azo-benzene are stirred in 50 parts of hydrochloric acid (32° Tw.) and 500 parts of water and are diazotised at 25–30° C. by the addition of 7.2 parts of sodium nitrite dissolved in a little water. When diazotisation is complete the diazo solution is slowly added with good stirring to a solution of 43 parts of m-stearoyl-amino-diethylaniline in 500 parts of methylated spirits. After stirring 1-2 hours sodium acetate is added to make the liquid neutral to Congo red paper and stirring continued until coupling is complete. The dyestuff is collected by filtration, washed well with water, and dried at 50-60° C.

The dye so obtained can be described as 4-(p-diethylamino - o - stearoylamino - benzene-azo) - 2:6 - dichlor-2':6'-dimethyl-4'-methoxy-azobenzene.

0.25 part of this dyestuff is added to 100 parts of a 25% solution of cellulose acetate in acetone which is then dry-spun in the normal manner to give a yarn dyed a full red shade which is very fast to wet scouring treatments.

Having described my invention what I desire to secure by Letters Patent is:

1. Process for the production of a new azo dye which comprises reducing to an amino group the nitro group of a substituted 4-nitro-4'-lower-alkoxy-azobenzene in which the substituents, apart from the 4-nitro group and the 4'-alkoxy group, are selected from the group consisting of lower alkyl, lower alkoxy, halogen, and acidylamino, each of at least three of said substituents being in an ortho position to the azo group.

2. Process for the production of a new azo dye which comprises reducing to an amino group the nitro group of 4-nitro-2:6-dichlor-2':6'-dimethyl-4'-methoxy-azobenzene.

3. Process for the production of a new azo dye which comprises reducing to an amino group the nitro group of 4-nitro-2:6-dichlor-2'-methyl-4'-methoxy-azobenzene.

4. A substituted 4-amino-4'-lower-alkoxy azobenzene in which the 4-amino group is primary and in which the substituents apart from the 4-amino group and the 4'-alkoxy group are selected from the group consisting of lower alkyl, lower alkoxy, halogen, and acidylamino, each of at least three of said substituents being in an ortho position to the azo group.

5. 4-amino - 2:6 - dichlor - 2':6' - dimethyl-4'-methoxy-azobenzene.

6. 4-amino-2:6-dichlor-2'-methyl-4'-methoxy-azobenzene.

7. Cellulose ester or ether materials colored with an amino-azo compound claimed in claim 4.

8. Cellulose acetate colored with an amino-azo compound claimed in claim 4.

9. Cellulose acetate colored with 4-amino-2:6-dichlor-2':6'-dimethyl-4'-methoxy-azobenzene.

10. Cellulose acetate colored with 4-amino-2:6-dichlor-2'-methyl-4'-methoxy-azobenzene.

JOHN WRIGHT.

REFERENCES CITED

The following references are of record in the file of this patent:

UNITED STATES PATENTS

| Number | Name | Date |
|---|---|---|
| 2,216,446 | McNally et al. | Oct. 1, 1940 |
| 1,557,265 | Miller | Oct. 13, 1925 |
| 2,081,244 | Matzdorf et al. | May 25, 1937 |
| 2,176,505 | McNally et al. | Oct. 17, 1939 |
| 1,963,133 | Jordan et al. | June 19, 1934 |
| 1,914,549 | Woodward | June 20, 1933 |

FOREIGN PATENTS

| Number | Country | Date |
|---|---|---|
| 471,923 | Great Britain | Sept. 13, 1937 |
| 810,412 | France | Dec. 28, 1936 |
| 762,830 | France | Jan. 29, 1934 |